United States Patent [19]

Töpfer et al.

[11] Patent Number: 5,163,742
[45] Date of Patent: Nov. 17, 1992

[54] METHOD OF DISTRIBUTING BRAKE PRESSURE TO THE AXLES OF A MOTOR VEHICLE WITH AN ABS PRESSURE-MEDIUM BRAKE

[75] Inventors: Bernhard Töpfer; Norman Millner, both of Stuttgart; Ali Aminpour, Waiblingen; Wolfgang Scheer, Stuttgart, all of Fed. Rep. of Germany

[73] Assignee: Mercedes-Benz AG, Fed. Rep. of Germany

[21] Appl. No.: 666,617

[22] Filed: Mar. 8, 1991

[30] Foreign Application Priority Data

Mar. 8, 1990 [DE] Fed. Rep. of Germany ....... 4007360

[51] Int. Cl.$^5$ .............................. B60T 8/60; B60T 8/26
[52] U.S. Cl. ...................................... 303/100; 303/95; 303/DIG. 4; 364/426.01
[58] Field of Search ............... 303/104, 106, 100, 105, 303/113 R, 9.69, DIG. 3, DIG. 4, 22.1, 95; 364/426.1, 426.2

[56] References Cited

U.S. PATENT DOCUMENTS

| 4,402,047 | 8/1983 | Newton et al. | 303/100 X |
| 4,606,586 | 8/1986 | Eckert et al. | 303/100 X |
| 4,685,745 | 8/1987 | Reinecke | 303/100 |

FOREIGN PATENT DOCUMENTS

| 3226074 | 9/1983 | Fed. Rep. of Germany . |
| 3323402 | 10/1984 | Fed. Rep. of Germany . |
| 3502049 | 7/1986 | Fed. Rep. of Germany . |
| 3502051 | 7/1986 | Fed. Rep. of Germany . |
| 3711175 | 10/1987 | Fed. Rep. of Germany . |
| 3829951 | 3/1990 | Fed. Rep. of Germany . |

Primary Examiner—Matthew C. Graham
Assistant Examiner—Peter M. Poon
Attorney, Agent, or Firm—Evenson, Wands, Edwards, Lenahan & McKeown

[57] ABSTRACT

A method utilizes components of an existing anti-lock brake system (ABS) in order thereby to achieve an automatically self-optimizing inter-axle brake-pressure distribution acting far below the wheel lock limit. For this purpose, the brake pressure and, hence, the brake-force distribution are regulated axle-specifically far below the wheel lock limit too. An immediate dynamic intervention is, on one hand, effected in the case of sufficiently large wheel-speed differences between the axles. On the other hand, an adaptive predetermination of correct brake-force distributions is made the basis for each current regulating intervention. Even before the occurrence of large speed differences, the brake-force distribution expedient in each case for these is here predictively determined, stored, and, if required, correspondingly adapted to current requirements, i.e. corrected, in the course of subsequent dynamic braking demands. Requisite determination parameters are obtained for each journey either via characteristic diagrams specific to the family of vehicles or are determined individually on the individual vehicle by a learning approximation routine.

20 Claims, 7 Drawing Sheets

METHOD OF DISTRIBUTING BRAKE PRESSURE TO THE AXLES OF A MOTOR VEHICLE WITH AN ABS PRESSURE-MEDIUM BRAKE

BACKGROUND AND SUMMARY OF THE INVENTION

The present invention involves a method and apparatus for distributing brake pressure to the axles of a motor vehicle with an anti-lock brake system (ABS) pressure-medium brake.

In conventional brake systems for commercial vehicles, a brake which adapts automatically to the load (also known as an ALB) is generally provided for the purpose of optimum utilization of the brake system in terms of braking dynamics, and in particular also for the purpose of taking into account large differences in axle load between an empty vehicle and a laden one.

It is the object of such systems, in accordance with the lower axle load in the case of partial loading, to influence the braking forces by load-dependent reduction of the brake pressure input from the brake pedal, principally at the rear axle but, under certain pre-conditions, also at the front axle. Thus, in particular, the risk of skidding due to overbraked rear axles is lessened or eliminated. In addition, the intention is thereby to achieve optimum utilization of the brake system irrespective of the loading condition.

In air-sprung vehicles, the bellows pressure is, for example, used as a measure for the input variable indicating the axle load, while in steel-sprung vehicles the axle deflection, which is transmitted via a linkage, or the electrical signal of a pressure- or tension-sensitive electronic load transmitter connected in series with a spring bearing is generally used as shown in German Offenlegungsschrift 3,711,175.

The mechanical influencing of axle-specific brake-pressure regulating valves is susceptible to damage under tough operating conditions. An additional disadvantage of known systems is the fact that corresponding structural elements in diverse and often also structurally non-uniform variants are required even within one production series of vehicles. In addition, load detection based on a transmission linkage is imprecise, e.g. in the case of joint brake-pressure regulation of the axle groups of vehicles with leading or trailing axles or in the case of hard suspension. Such known detection also involves considerable costs.

Previously proposed systems of the above-described type or braking methods performed on them are without exception based on regulating interventions into a brake application which is in each case under way, in the sense of a current braking-force distribution recognized as inexpedient or incorrect. Here, the aim of the braking method is always the elimination of setpoint deviations which have already occurred. Such a corresponding method is disclosed in German Offenlegungsschrift 3,829,951.

Furthermore, German Offenlegungsschrift 3,323,402 describes a brake system for motor vehicles in which the brake-pedal pressure, power-assisted via pressure lines in which pressure modulators are inserted, can be transmitted to the wheel-brake cylinders. This system comprises, among other things, sensors for ascertaining the rotational behavior of the wheels and the speed of the vehicle and electronic circuits for the processing and logical combination of the measured values and for the production of actuating signals for the modulators. By way of the brake pressure modulators, both control of the brake pressure distribution as a function of the brake slip of the front wheels and brake-slip regulation which prevents locking up of the front wheels is performed.

German Offenlegungsschrift 3,226,074 describes a braking-force regulating system for motor vehicles in which a setpoint value for the deceleration of the motor vehicle is specified, the actual value is determined and the brake pressure is regulated accordingly from the deviation of the setpoint and the actual value. Regulation as a function of the slip between the roadway and the wheel is also provided.

It is an object of the present invention to provide an improved method of brake-pressure distribution to the axles of a motor vehicle with an ABS pressure-medium brake, which method leads to corresponding rotational wheel speeds and to this extent to a uniform approach to the lock-up range. The method thus provides an improvement in the range of frequent braking, i.e. already in the adaptive-braking range well below the normal range of action of an anti-lock brake system (ABS).

The foregoing objects have been achieved in accordance with the present invention such that when a limiting value is exceeded, for intervention in individual brake applications is, in a first step, performed dynamically in the sense of a continuously cyclic acquisition and processing of current actual wheel-speed differences for the purpose of immediate influencing of the brake-pressure distribution while the respective braking operation is still underway and in a second step, a second regulation in the manner of an adaptively predictive precontrol of the brake-pressure distribution $\phi$ for any retardation levels is made the basis of this first regulation. Mutually associated steady-state values of the referred inter-axle speed difference and of the retardation in the case of the old brake-pressure distribution are sought on the basis of predetermined limiting values for the time rate of change of these variables.

As soon as steady-state values are present, then, after at least one initial brake application, parameters of a brake-pressure distribution function are determined according to the present invention, in which function the setpoint deceleration demanded by the driver via the brake pedal is included. This brake-pressure distribution is taken as the basis for the subsequent braking operations. As soon as, after the determination of the parameter in the course of a subsequent brake application, a second, smaller limiting value is exceeded by a steady-state value of the referred speed difference, the old value of the brake pressure distribution function is corrected to a new value by way of the first regulation in the current cycle.

The method envisages the achievement of identical wheel speeds by adaptive regulation on two levels of action, one being steady-state and the other being dynamic. Accordingly, on one hand, an immediate dynamic intervention occurs, given sufficiently large wheel-speed differences between the axles. On the other hand, an adaptive predetermination of "correct" braking-force distributions is made the basis for each current regulating intervention. For this purpose, as a function of the retardation level selected at the brake pedal, the braking-force distribution appropriate for this in each case is determined as an estimated value, stored even before large differences in rotational speed occur, and adapted, i.e., corrected, if required in the course of subsequent dynamic braking demands.

The dynamic intervention can, for example, be advantageously carried out in practice according to the known method in accordance with the German Offenlegungsschrift 3,829,951.

Generally speaking, the method according to the present invention allows the utilization of tried and tested signal paths and transmitters of a presently commercially available ABS in order to achieve a load-dependent braking function acting well below the wheel lock limit. The method according to the invention allows higher than customary brake pressures to be fed in at the front axle independently of the control of brake pressure at the rear axle. By corresponding expansion of an appropriate microprocessor program of an electronic ABS controller, it is possible to dispense completely with the mechanical (or, in electropneumatic brake systems, the additional electronic) wheel or axle-load sensors.

The method according to the present invention allows an economical optimum utilization of the overall braking-power capacity of a brake system for commercial vehicles, while additionally minimizing the number of signal transmitters required and of their requisite connecting paths to an electronic control device. In this respect, the method also brings about a marked increase in reliability of a correspondingly acting brake system.

BRIEF DESCRIPTION OF THE DRAWINGS

These and other objects, features and advantages of the present invention will become more apparent from the following detailed description of several preferred embodiments when taken in conjunction with the accompanying drawings wherein:

FIG. 2a is a graph of a first parameter field for determining parameter a;

DETAILED DESCRIPTION OF THE DRAWINGS

Figure 1:
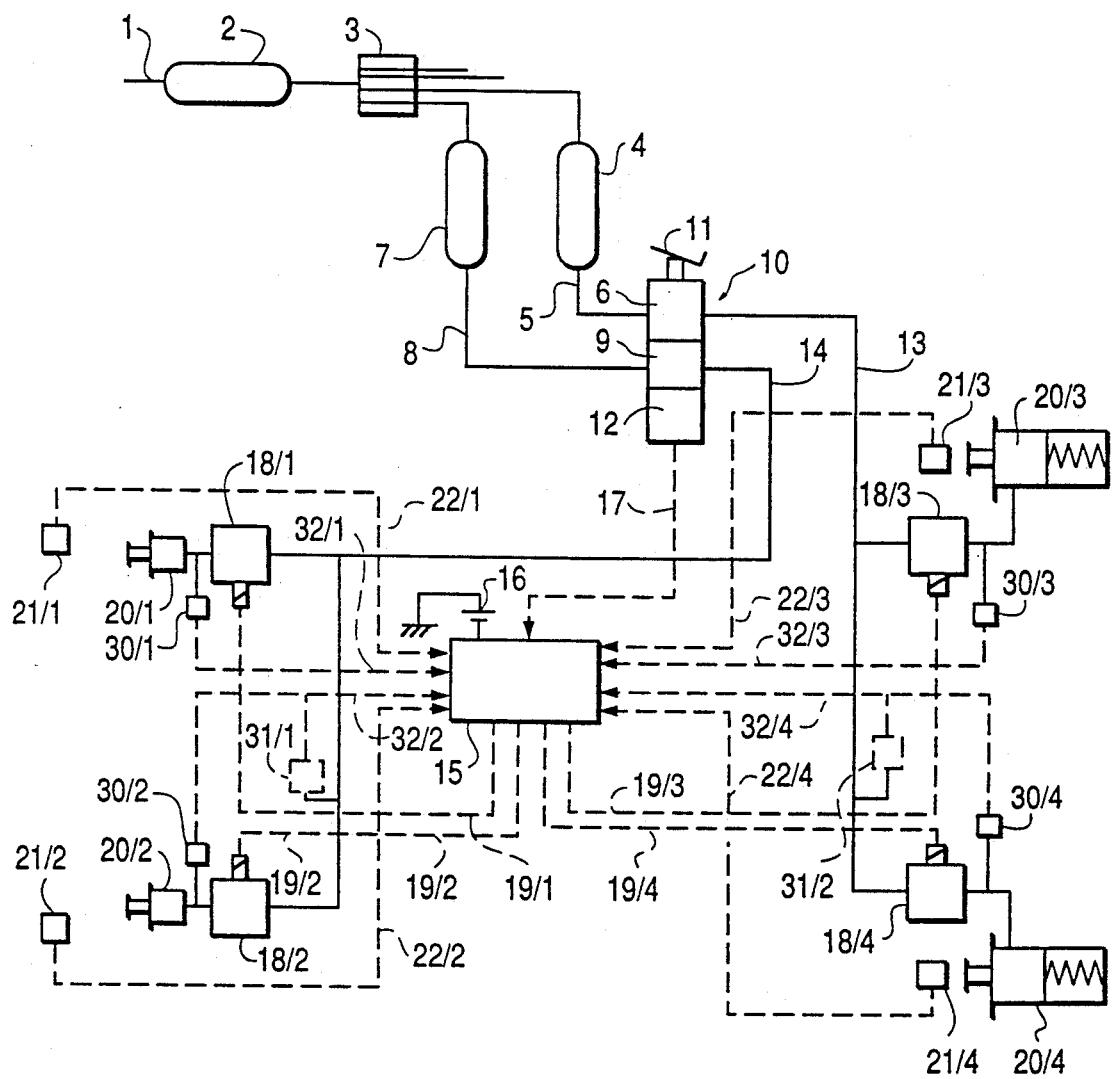
FIG. 1 schematically illustrates those components of a typical air brake system associated with the running gear suitable for carrying out the method of the present invention.

For a better understanding of the method of the present invention, the explanation of the method is preceded by the description of a brake system suitable for carrying out that method. According to FIG. 1, such a brake system comprises components which are already known per se from high-quality electronic ABS systems with centralized control and ABS valves near the wheels. By way of sensors for the rotary motion of the wheels, systems of this kind have the ability to prevent locking up of individual wheels, when the adhesion limit determined by the friction pairing of tire and road is reached using wheel brake pressures controlled as a function of wheel speeds, with the brake pressure at the corresponding wheel being reduced or at least not increased further for as long as the tendency towards locking up exists.

A reservoir 2 is supplied with pressure medium by a feed line 1 coming from an air compressor (not shown). Via a multi-way safety valve 3, this pressure medium passes into sub-reservoirs 4 and 7 of a plurality of brake circuits. These reservoirs are assigned, by way of example, to a front-axle and rear-axle brake circuit of the vehicle. Pressure medium flows via supply lines 5 and 8 to two individual sections 6 and 9 of a service brake valve 10 which is actuated by the pedal 11. An electrical pressure pick-up or a position transmitter 12 is assigned to the valve 10 or pedal 11 and is positionally connected to the pedal 11 or the valve actuated by it to serve for an identification of the driver's intention ($Z_{setpoint}$). Via service pressure lines 13 and 14 on the output side, individual sections 6 and 9 of the service brake valve 10 supply electrically controllable valves 18/1, 18/2 and 18/3, 18/4, respectively, or two different axles with pressure medium, with the valves 18/1 to 18/4 being installed near the axles.

The valves 18/1 to 18/4 can be of similar design to conventional ABS valves used in conventional pneumatic service brake systems with a superimposed electronic ABS. Preferably, however, the valves can have a more sturdy construction with a long service life, since these valves are intended to act in an extended modulation range in comparison with the relatively narrow wheel-lock limit range and, to this extent, are subject to a higher control workload than valves used purely for ABS. Electrically controllable pressure modulators, in particular, are also contemplated at this point.

Brake cylinders 20/1, 20/2 and 20/3, 20/4 of, for example, a vehicle front axle and rear axle, respectively are assigned to the valves 18/1, 18/2 and 18/3, 18/4, respectively. The valves are controlled electrically via corresponding control lines 19/1 to 19/4 by an electronic centralized-control device 15. Wheel-speed sensors 21/1 to 21/4 continuously record the rotational speeds of the wheels and, via corresponding lines 22/1 to 22/4, and emit wheel-specific speed signals to the electronic centralized-control device 15 which is powered from an electrical energy source 16.

Depending on the configuration of the valves 18/1, 18/2 and 18/3, 18/4, respectively, pressure sensors 30/1 to 30/4 on the brake-cylinder side or pressure sensors 31/1 and 31/2 assigned to the axles can also be provided. These sensors would transmit pressure signals to the control device 15 via receiving lines 32/1 to 32/4 and 32/2 and 32/4, respectively.

If configured as an ABS system, such a brake system could at most partially replace the function of an ALB. This is because a conventional ABS system only enters into action with the effect of a load-dependent brake in the case of extreme brake actuations or very unfavorable and rare road conditions. In general, a normal ABS cannot adapt the braking forces to the loading conditions in the range of frequent adaptive braking with decelerations below 2.5 m/s².

This adaptation becomes possible, however, via a software-based modification of a conventional electronically acting ABS system, by implementation of the method according to the invention. It can be accomplished in the form of an additional program to the actual ABS program. The additional program assesses a small number of fixed values and parameters and the wheel speeds as actual values, and also contains the necessary filter functions for wheel-speed differences with a considerably lower limiting frequency than that for an ABS program.

The method which can accordingly be performed according to the invention on such a brake system remedies the usually very limited suitability for ALB of a conventional electronic centralized-control device for an ABS system. In this respect, the present invention makes it possible for a software-modified ABS to exercise an ALB function even in the deceleration range below 2.5 m/s$^2$, with the effect that additional components and installations at the running gear for the achievement of an ALB function can be dispensed with without the braking comfort in the case of changing loads suffering or the necessity to sacrifice maximum utilization of braking capacity.

For this purpose, wheel-speed differences between the axles are evaluated in combination with other variables likewise derived from the wheel speeds, namely average wheel speeds and decelerations. The determination of absolute wheel slips is thus dispensed with. Instead, the exceeding of an inter-axle wheel-speed difference threshold is in each case used as a criterion for the evaluation of the wheel-speed signals supplied by the wheel sensors in order to trigger a limitation of the brake pressure at the affected axle in the case of a brake-pressure distribution not matched to the loading. This criterion is somewhat rough in the "dynamic" branch. In the "steady-state" branch, even relatively small speed differences can be identified with great reliability due to time averaging, the solution according to the invention thus being based particularly on this aspect.

For this purpose, the wheel speeds are determined and disturbing influences, such as, for instance, offset errors due to different tire diameters, are compensated by a software normalization routine by continuous comparison of the wheel speeds during unbraked travel. The error-corrected wheel-speed differences based on the average speed of the front wheels $V_{mV}$ then correspond to a first approximation to actual slip differences.

Since, due to differing tire properties and differing tire workload, the tire-slip characteristics can exhibit scatter, a limiting value for permissible deviations of the inter-axle wheel speeds during braking is established, with this limiting value allowing for such scatter. As long as this limiting value is not exceeded, a predetermined brake-pressure distribution can remain unaltered. If this limiting value is exceeded, it is corrected in a manner which reduces the exceeding of the limiting value. Thus, if such a limiting value can only be selected to be low enough, regulation of the brake-pressure distribution even well below the wheel lock limit, in a slip range in which by far the most frequent (o adaptive) braking operations occur and in which a normal ABS is inoperative, is possible.

In order to reduce the burden on the control device and improve comfort, the number of continuously repeated control cycles is minimized according to the present invention by storage, of detected parameters of the brake-pressure distribution:

$$\phi = P_o(front)/P_h(rear)$$

or parameters based on this particular payload or payload distribution during each individual journey with an essentially unknown loading condition. The brake-pressure distribution parameters corrected or updated in this way are used as current output values as the basis for the subsequent brake applications, or in other words, continuous adaptation of the brake-pressure distribution.

Because of the changed objective and control characteristic compared to a pure ABS function, a separate or parallel evaluation of speed signals as a supplement to a conventional electronic ABS control is expedient for the ALB function in the centralized electronics 15. This is necessary because the ABS function permits only limited smoothing or filtering to remove disturbances from these signals for a sufficiently rapid response behavior, whereas the ALB function requires a considerably lower limiting frequency of the filtering of values to be stored in order to make possible low-offset value inputs and hence an effective utilization of the ALB function and a sensitive response even in the case of tires which are non-circular or running at the wear limit.

The method according to the present invention for the wheel-speed-assisted adaptive optimization of inter-axle brake-pressure distributions differs from previously proposed, purely dynamic brake regulation methods which eliminate incorrect brake-pressure distributions, by predictively determining a better estimated value of the brake-pressure distribution on the basis of only a few brake actuations.

This estimated value of the new brake-pressure distribution $\phi_N$ can be determined from a previous brake actuation with known and, in general, non-optimum brake pressure distribution $\phi$, using the relation:

$$\phi_N = P_{front\ axle}/P_{rear\ axle} = a + b * Z_{setpoint} \qquad (1)$$

where:
$Z_{setpoint}$ is the braking deceleration input dependent on the driver's intention; and
a and b are parameters.

Figure 2A:
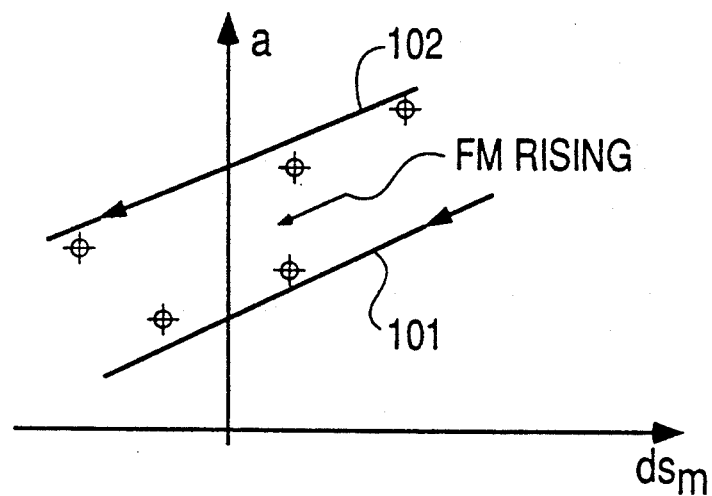

In this regard, FIG. 2a illustrates a first parameter field between limit lines 101 and 102 from which it is possible to determine the parameter:

$$a = (1 - f_m) * a_0$$

with
$a_0$ as base/starting value from the data of a selection of vehicles; and
$f_m$ as a specific vehicle mass factor $m_{current}/m_{laden}$ or alternatively:

$$a = c_1 + c_2 * ds_m$$

with
$c_1$, $c_2$ as operands from data of a selection of vehicles; and
$ds_m$ as a time average of the wheel-speed difference $v_{front} - v_{rear}$ referred to the front axle given a defined constant brake-pressure distribution $\phi$.

Each point in the field in FIG. 2a here corresponds to a specific vehicle.

Figure 2B:
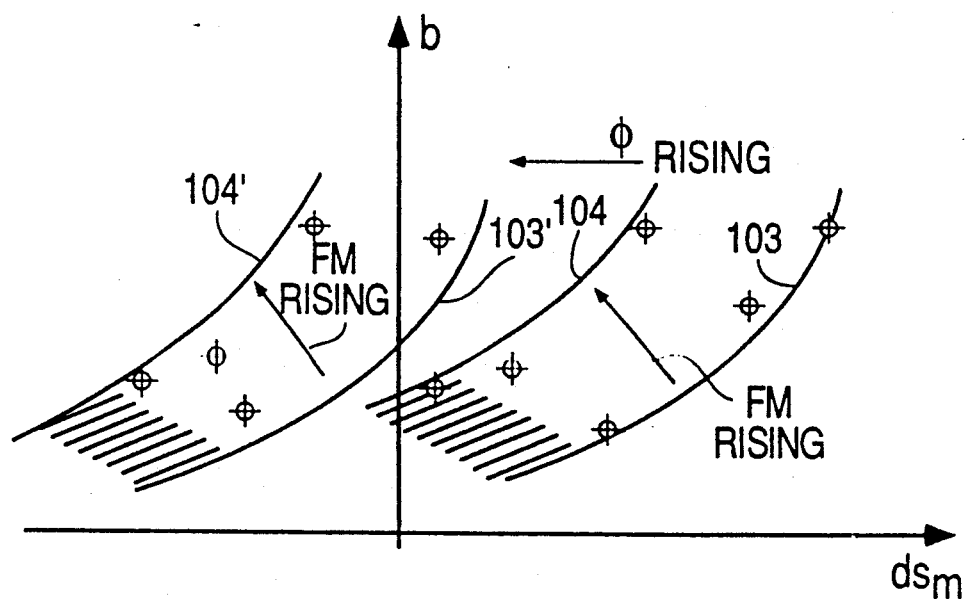
FIG. 2b is a graph of a second parameter field for determining parameter b.

FIG. 2b illustrates a parameter field in which, given a defined brake pressure distribution $\phi$ and with the above-mentioned vehicle mass factor $f_m$, parameter b can be determined as a function of $ds_m$ between limit curves 103, 103′ and 104, 104′, respectively, for the empty and the fully laden vehicle. Again, each point indicated in the field corresponds to a specific vehicle.

Parameters a and b can thus be determined using algorithms established jointly on the basis of preceding investigations on the scatter bands of the wheel bases, heights of the centers of gravity, etc., of entire families of vehicles such that, given a known brake-pressure distribution and a vehicle mass factor $f_m$ estimated from the pressure level and the retardation achieved, the referred wheel-speed differences ds alone, without further sensors, are sufficient for the determination of a and b. Pressure level is in this context to be understood as a weighted average obtained from pressure-sensor signals. The information from additional sensors which may be present for axle loads, fifth-wheel load, total mass or the like can be used, if required, to improve the estimated value for the vehicle mass factor $f_m$.

Parameters a and b can also be determined in an advantageous manner by a simple curve approximation. In this modification, taking the values and their behavior as a basis, the decisive parameters of the individual vehicle are identified from $ds_m$ and $Z_m$ during a few brake applications at the beginning of the journey, on the basis of plausible physical inter-relationships.

Starting from permanently stored, generally non-optimum, starting values $a_0$, $b_0$, the first braking operations identified as steady-state, where:

$$\phi = a_0 + b_0 * Z_{setpoint}$$

generally produce speed differences $ds_m$ from the association of which with the retardation $Z_m$ correction values da and db are calculated.

Figure 2C:
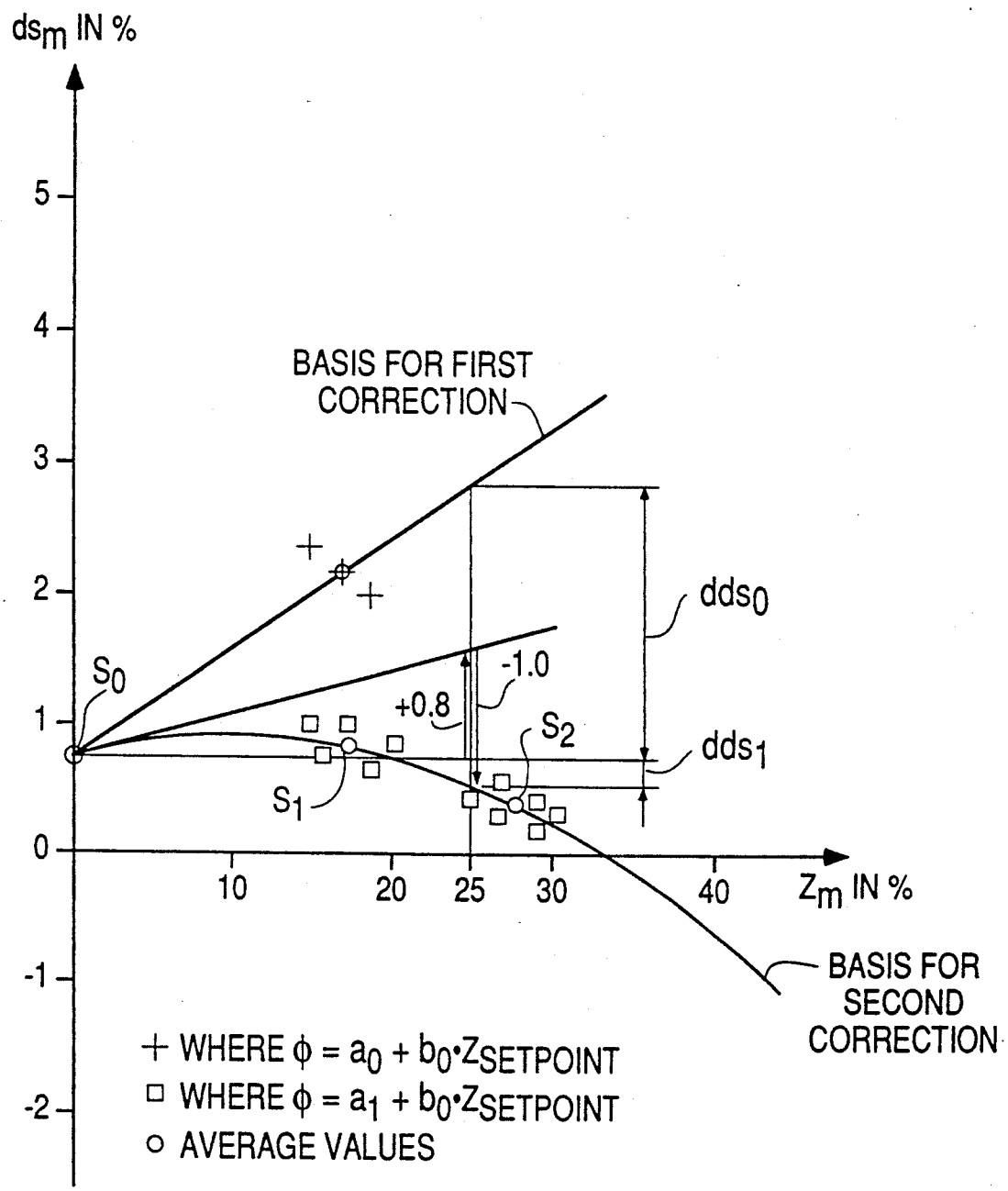
FIG. 2c is a graph for the alternative determination by calculation of parameters a and b.

In FIG. 2c, steady-state values determined for $ds_m$ are plotted as a function of associated values $Z_m$. The value of $ds_m$ at 0% retardation corresponds to the unbraked condition immediately prior to the onset of braking and is therefore also referred to as $ds_m$. An approximation parabola of the form:

$$ds = ds_u + a_{p1} * z + a_{p2} * z^2$$

is drawn through the scatter field of the value pairs $ds_m/Z_m$ determined and the point $S_0$ (at $ds_u$), the value pairs being collected in two groups above and below, respectively, a value of $Z_m$ in the middle of the range of frequent braking (here, for example, about 22.5%), by the central points $S_1$ and $S_2$, determinable mathematically using elements, of which, together with $S_0$, a parabola is uniquely defined.

For ideal braking-force distribution, no speed difference due to braking force would occur, irrespective of Z, and $ds_m = ds_u$ —constant would apply. By way of approximation, too small a value of a in the function for $\phi$ (i.e. an overbraking of the front axle irrespective of Z) leads to a $ds_m$ which increases linearly with Z, while too small a value of b has the effect of a $ds_m$ which increases quadratically as Z rises. On the other hand, the optimum value for a obviously corresponds to the ratio of the static axle loads and that for b to the dynamic axle load transfer.

The deviation of $dds_1$ of about 0.2%, which can be seen in FIG. 2c and is per se relatively small, at $Z_m = 25\%$ retardation after a first correction of a arises due to a compensation of the excessively small a by an excessively large c. In the case of high retardations, the front axle would be highly overbraked.

Thus, to this extent, the parabola coefficients indicate the relation of da and db to one another, while the absolute size of these changes is extrapolated on the basis of the results of a preceding first correction. To this extent, the parabola coefficients thus reflect separately the error of the initial braking-force distribution as regards the static and dynamic axle loads.

In the example according to FIG. 2c, da and db*Z would have to be defined in the ratio 0.8:1.0, such that, at the $Z_m = 25\%$ chosen as representative, the change of $\phi_N$ leads to about 0.2% relative change of ds.

For a corresponding computing routine, it can be stated that, after a small number $n_1$ of brake applications, a rough first correction is first carried out only of a, using the initial values $a_0$ and $b_0$, with the correction being made proportional to the relative speed difference $dds_0$ determined during this process. The result is $a_1 = a_0 + da_1$, where $da_1 = k * dds_0$; for k, values between 0.2 and 0.5, for example the value 0.3 is used. A further number of brake applications with $\phi_N = a_1 + b_0 * Z_{setpoint}$ entails new value pairs $ds_m$, $Z_m$, through the cluster points $S_1$, $S_2$ of which the parabola is then drawn. Then, da and db can be calculated from $a_{p1}$, $a_{p2}$ and from the change of $dds_u$ to $dds_1$ upon the transition from $a_0$ to $a_1$. The course of a corresponding routine is explained below with reference to FIG. 4c.

Figure 3:
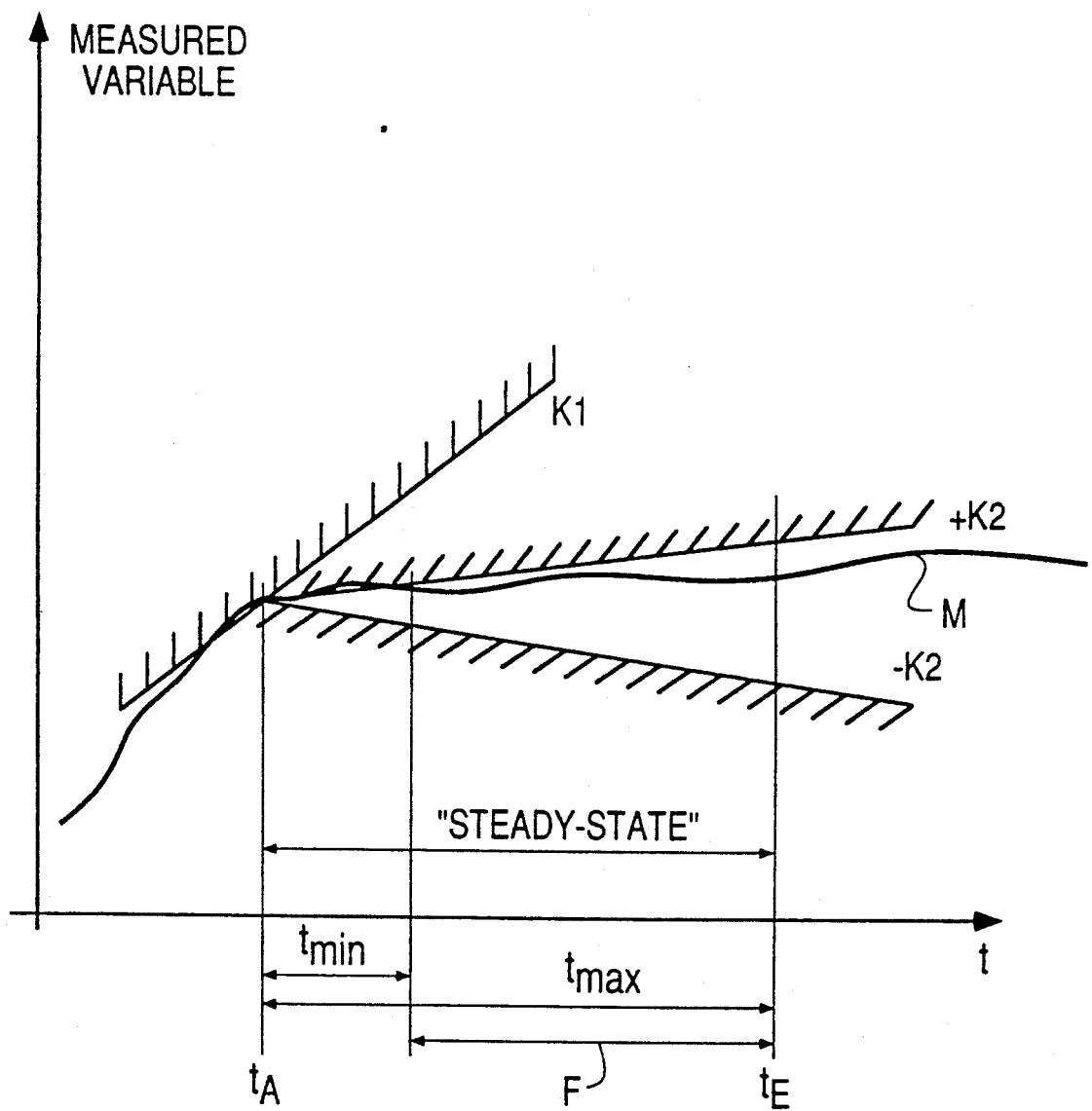
FIG. 3 is a graph of a braking variable within a time window during which the variable leads to the identification of a stable, steady-state condition.

FIG. 3 shows the diagram of a braking variable M (derived from the brake pressure, the braking deceleration or wheel-speed difference) against the time t within a time window F between an observation starting time $t_A$ and an observation end time $t_E$. The time window begins after the expiration of a minimum time $t_{min}$ and ends after the maximum time $t_{max} = = t_E - t_A$. The first undershooting of a limiting steepness $K_1$ defines starting time $t_A$.

At the starting time $t_A$, the measured variable M is, after the expiration of the minimum time $t_{min}$, examined as to whether it remains between two limit lines with smaller slopes $K_2$ and $-K_2$, i.e., a point of intersection with the latter no longer occurs, in the subsequent time window F. Then and only then is the presence of a "steady-state braking phase" inferred in the observation time $t_E - t_A$, from which phase the parameters a and b for the predictive adaptation are obtained.

Figure 4A:
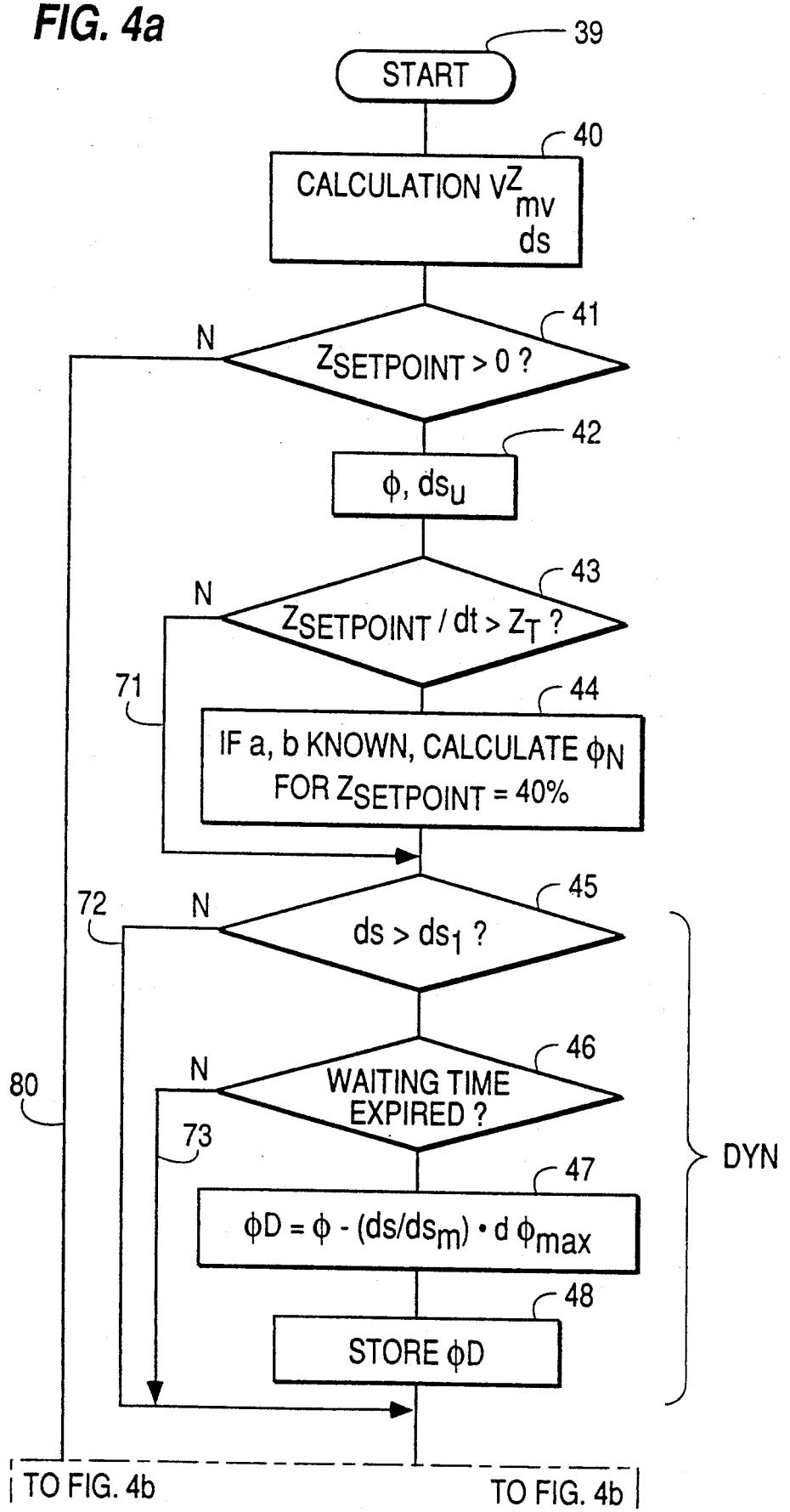
FIG. 4a is a first part of a flow chart of the method according to the present invention, comprising the so-called dynamic intervention.
Figure 4B:
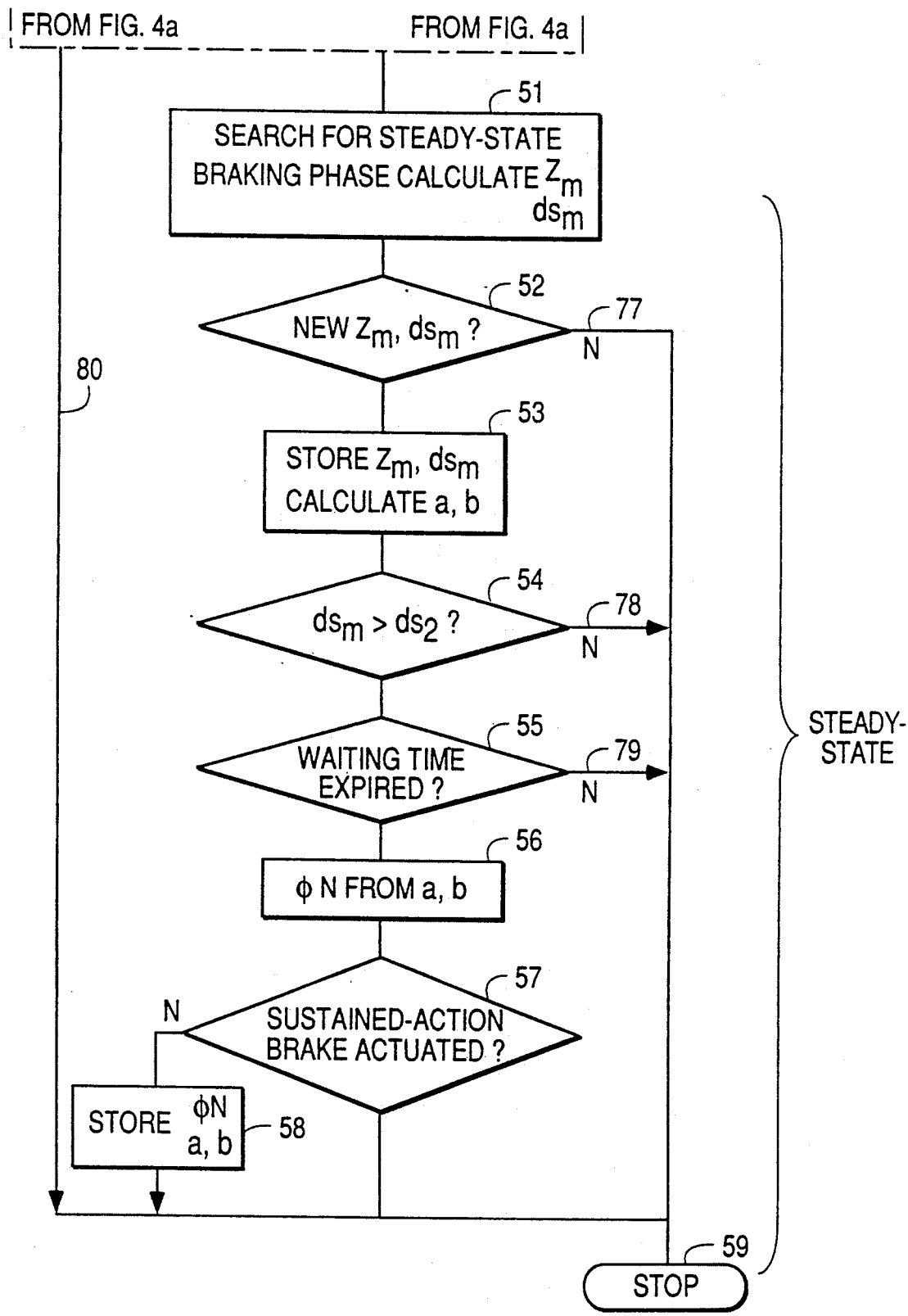
FIG. 4b is a second part of a flow chart of FIG. 4a of the method according to the present invention, relating to the phase identified as steady-state and its evaluation.
Figure 4C:
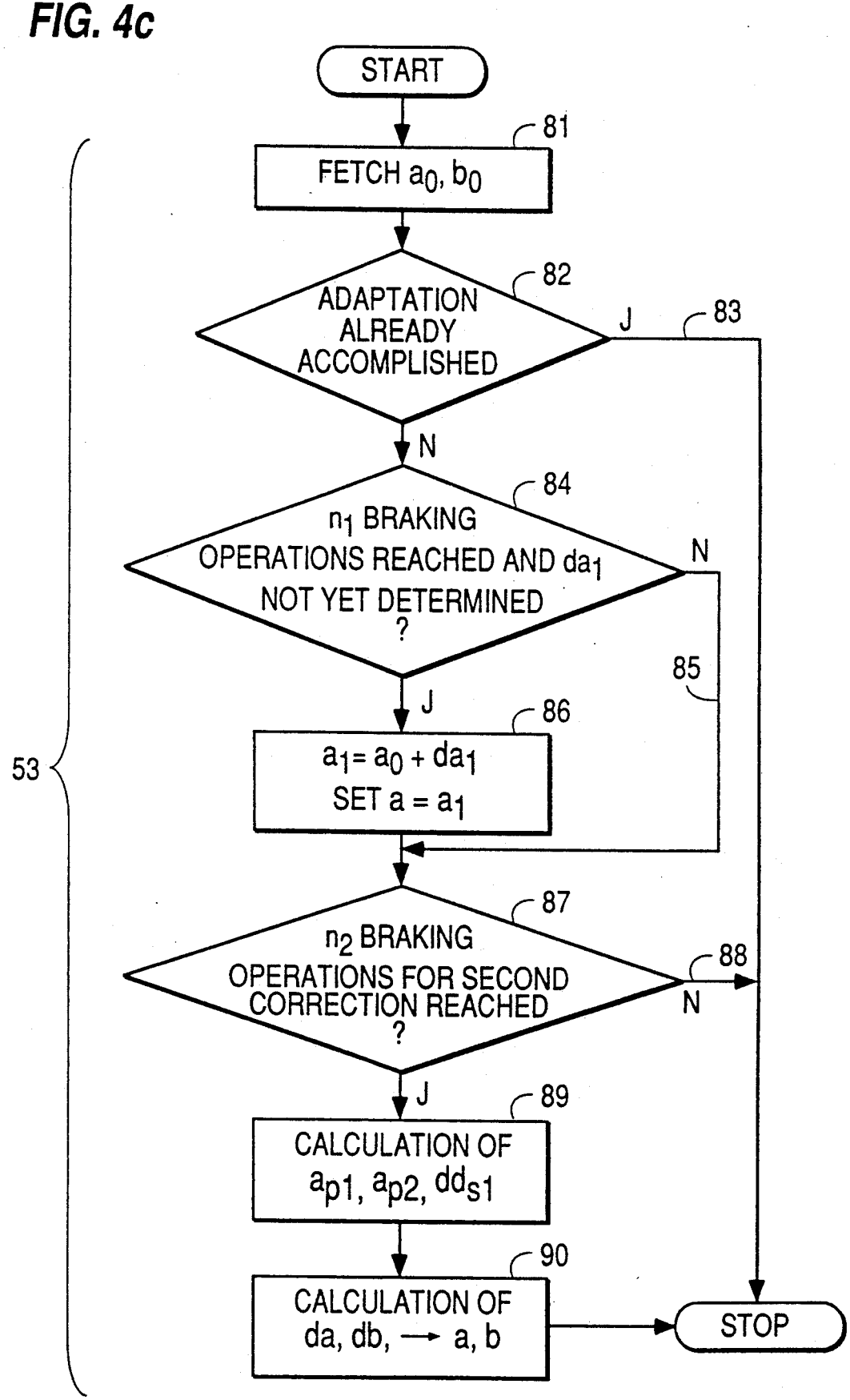
FIG. 4c is a flow chart for the alternative calculation of parameters a and b as illustrated in FIG. 2c.

FIGS. 4a to 4c are flow charts which illustrate the braking procedure according to the present invention. FIG. 4a here comprises an intervention in the sense of a dynamic regulation similar to that described in German Offenlegungsschrift 3,829,951 and in a current brake application. FIG. 4b contains the steady-state prediction routine STAT according to the present invention. FIG. 4c illustrates, by way of a sub-flow chart, the determination of parameters a and b within the prediction routine STAT on the basis of the inter-relationships described in conjunction with FIG. 2c.

From the switching on of the ignition circuit to the beginning of driving onwards, the cycle illustrated in FIGS. 4a and 4b is passed through continuously after the loading, at the start, of an invariable permanently stored starting value for the brake-pressure distribution $\phi$.

According to FIG. 4a in step 40, an average value $V_{mV}$, of the wheel speed of the front wheels and the time rate of change Z thereof and the wheel-speed difference $ds = (V_{front} - V_{rear})/V_{mV}$ referred to the front axle are then calculated (in a cycle executed every 10 to 30 milliseconds from the start 39 irrespective of the braking condition), the latter preferably as a sliding average over a certain number of steps.

Upon monitoring of the pedal travel or the pedal brake pressure, there follows an inquiry 41 as to whether a braking deceleration input $Z_{setpoint}$ by the driver greater than zero is present.

If this is the case, then the old or previous brake-pressure distribution $\phi$ is loaded in step 42 as an output variable. If the parameters a and b are already known due to preceding brake applications on this journey, the "optimum" brake-pressure distribution $\phi_N$ according to relation (1) is calculated for the current braking demand $Z_{setpoint}$. In addition, during the first execution of the cycle during a brake application, the current value of the wheel-speed difference ds in relation to the front axle is stored as $ds_u$, where $ds_u$ characterizes the unbraked condition before the occurrence of a braking deceleration. If, on the other hand, $Z_{setpoint}$ is not greater than zero, the end 59 of the cycle is reached via a path 80.

Step 42 is followed by an inquiry 43 as to whether a rapid pedal actuation is present, i.e. whether the time rate of change of $Z_{setpoint}$ turns out to be greater than a threshold value $Z_T$ for "rapid". For this purpose, it is possible, for example, for the pedal travel to be recorded and a derivative obtained. If this is the case, i.e. rapid pedal actuation, then, in step 44, the braking deceleration to be expected is assumed to be large and a corresponding brake pressure distribution $\phi_N$ (e.g. $Z=40\%$) is calculated and fed in as a precaution (provided that quantities a and b have already been determined previously). The wheel-speed difference ds referred to the front axle is then checked in an inquiry 45 as to whether it is greater than a limiting value $ds_1$.

If, in step 43, $Z_{setpoint}$ turns out not to be greater than a threshold value $Z_T$ for "rapid", a corresponding recalculation and feed-in in accordance with step 44 is omitted and the inquiry 45 then occurs immediately.

The result of the inquiry in step 45 determines whether the dynamic intervention routine DYN is then executed or not. ds can turn out to be greater than a first limiting value $ds_1$ particularly when a and b have not been determined previously and an initial brake-pressure distribution $\phi$ fed in was consequently too far out. If ds is greater than $ds_1$, the program routine DYN is executed for a dynamic intervention, beginning with the inquiry 46.

In the inquiry 46, the time which has passed since the last change of $\phi$ during this brake application is first compared with a minimum waiting time. The minimum waiting time is here proportioned such that hunting is avoided. If the minimum waiting time has expired, a new brake-pressure distribution is calculated in step 47 in accordance with the relation $\phi_D=\phi-(ds/dsm)*d\phi_{max}$, $\phi_D$ here only applies for dynamic intervention into the current brake application. The size of the change of $\phi$ is thus proportional to ds and its absolute size is determined by the maximum possible changes dsm and $d\phi_{max}$. If, on the other hand, the waiting time has not expired, routine 47 is bypassed in this cycle in accordance with 73, and the brake-pressure distribution thus remains initially unchanged.

In step 48, the $\phi_D$ which may have been determined is stored as new brake-pressure distribution $\phi$ for the current brake application and is used in the next cycle. According to FIG. 4b, the parameters a and b of the defining equation for $\phi_N$ are calculated on the basis of steady-state braking phases identified according to FIG. 3. The precondition is thereby created for the future possibility of feeding in initially an at least approximately "correct" brake-pressure distribution for the respectively stipulated braking demand $Z_{setpoint}$ in the case of each further brake application during this journey. For this purpose, a continuous search for steady-state braking phases is first of all performed in step 51 according to FIG. 3. At the end of a steady-state braking phase, the average values $Z_m$ and $ds_m$ of the variables Z and ds over the duration of this phase are calculated.

If the following inquiry 52 reveals that no steady-state values or no new steady-state values $Z_m$, $ds_m$ are yet present, the end of the cycle is reached via the path 77. Otherwise, a and b are calculated in step 53 from the stored and, if applicable, newly added steady-state values. The functional inter-relationships of these quantities, as depicted in FIG. 2, have been predetermined for a family of vehicles and stored in the form of fixed equations in the central logic. This storage is dispensed with if a and b are determined using the approximation method illustrated in FIG. 2c.

In a subsequent inquiry 54, a test is performed as to whether the last steady-state value $ds_m$ is still larger than a second limiting value $ds_2$ which is smaller than the above-mentioned limiting value $ds_1$ for the dynamic intervention according to FIG. 4a. If this is the case and if, according to inquiry 55 which is similar to inquiry 46 a minimum waiting time has again passed since the last change of the brake-pressure distribution, then, in step 56, a new brake-pressure distribution $\phi_N$ is calculated on the basis of a and b according to FIGS. 2a and 2b or 2c. Since the brake pressures of front and rear axle are recalculated in each cycle on the basis of the current $\phi$ value in each case, the then correct brake-pressure distribution is present (i.e. within the scope of the accuracy of the estimated value) from the following cycle on. If according to inquiry 54 the value $ds_m$ is not greater than the permissible limiting value or if, according to inquiry 55, the waiting time has not yet expired, the end 59 of the cycle is reached via the path 78 or 79.

Finally, before reaching the end 59 of the cycle, a distinction is made with an inquiry 57 as to whether the sustained-action brake (engine brake or retarder) has been simultaneously actuated because this makes it own contribution to the referred speed difference $ds_m$ which is independent of the brake-pressure distribution. Accordingly, the values of $\phi_N$, a and b are only stored in step 58 if the sustained-action brake is switched off. The entire cycle now beings again at the start 39 and is repeated cyclically during the entire duration of the journey.

With the present invention, it is also possible to carry out, for example, the adaptation for $\phi$ in stepped fashion, such that, when the steady-state value $ds_m$ of the specific inter-axle speed difference ds exceeds the limiting value $ds_2$, a change of the brake-pressure distribution $\phi$ by a certain fraction (e.g., ⅔) of the calculated $\phi$ correction is effected first of all.

It is also possible, depending on the size of the remaining wheel-speed difference identified in subsequent steady-state phases, for an iterative adaptation of the braking-force distribution to be effected, a further correction only being made, however, after a certain number (e.g. 5 to 10) of brake applications having, for example, at least 20 steady-state phases. The criterion for the exact number can be the scatter of the evaluated steady-state values, with values in the case of a simultaneously activated sustained-action brake being handled separately if required. Subsequently, the vehicle loading condition and all the parameters acting on the vehicle can be presumed to be known, a and b thus remain constant in this case.

Intervention in the case of wear is possible if required, with slight changes in the wheel-speed difference are accepted. If, for example due to unhitching of a semitrailer, the threshold for the dynamic intervention $ds_1$ is suddenly exceeded, then the procedure described with reference to FIGS. 4a and 4b is started again in addition to the dynamic control intervention now effected.

FIG. 4c illustrates a routine by which the respective parameters a and b for the individual vehicle can be determined in accordance with FIG. 2c. It is accomplished, for example, within the function block 53 of FIG. 4b. After a START initialization, the permanently stored values $a_0$ and $b_0$ are first of all fetched in step 81 and an inquiry is executed in step 82 as to whether db has already been determined during the current journey, i.e. for the current vehicle condition. If this is the case, the exit STOP of the routine is reached immediately via path 83. If this is not the case, then, after a small number $n_1$ of brake applications, about which an inquiry is made in step 84, a rough first correction $a_1 = a_0 + da_1$ is performed in step 86 using starting values $a_0$ and $b_0$, where $da_1 = k*dds_0$ and, for example, $0.2 < k < 0.5$. If $da_1$ has already been determined and the number of already performed brake applications is greater than $n_1$, this operation is bypassed on path 85.

In step 87, an inquiry is made as to whether the number of brake applications already performed exceeds the predetermined number $n_2$. If this is not the case, no further calculations are performed, cf. path 88. Instead of a fixed value of $n_2$, an evaluation of the scatter of the steady-state values of $ds_m$ can also serve as a criterion for the calculation of the parabola coefficients $a_{p1}$, $a_{p2}$. If the condition 87 is fulfilled, then, in step 89, $a_{p1}$, $a_{p1}$ and $dds_1$ are calculated and, in the following step 90, da and db and, from these, a and b, are then determined and the STOP status is reached.

According to the method of the present invention, the variables $ds_m$ and $Z_m$ can be formed as average values of so-called stead-state braking phases and the undershooting of certain limiting values for the time rat of change of this variable can serve as the criterion for the presence of such a steady-state phase.

In order to obtain uniform lining wear at all axles or wheels, it is furthermore possible to permit brake-pressure changes relative to the "optimum" pressures, determined on the basis of a and b, after a number of braking operations which is required for the identification of the correct parameters a and b, at individual axles for the remainder of a current journey in order to compensate any imbalances in lining wear which may have been detected.

The size of the brake-pressure change, which is determined by the extent of the inequality of wear, is then limited by the continuously proceeding monitoring of the speed differences to the extent that exceeding of the higher threshold $ds_1$ is prevented.

The single or multiple exceeding, in rapid succession, of the first limiting value $ds_1$ of the brake-pressure control can also be taken as an occasion for recalculating the parameters a and b in accordance with the abovementioned algorithms and not permitting any wear regulation during this phase. In addition to undesirably large wear corrections, the case of substantial load changes during the journey (e.g. unloading, unhitching without switching off the engine) is thereby also reliably covered.

It is also possible with the present invention for the currently calculated average speed difference $ds_m$ to be replaced by the difference dds of this value relative to a value $ds_u$ (speed difference in the unbraked condition. This $ds_u$ is determined in a time period immediately prior to the onset of the braking effect. Value dds is then equal to $ds - ds_u$. In this way, it is also possible to make correct allowance, as regards tendency, for the braking effects of upstream sustained-action brakes (engine brake, retarder), these effects acting in general only on the rear axle.

It is here possible, on the basis of at least two steady-state braking phases having a different $\phi$ but an approximately equal retardation level $Z_m$, for a quotient $q = (p_v - p_h)/dds$ to be calculated, which makes possible the calculation of a $\{Delta\ p\} = ds_u*q$ for further brake applications during this journey, by which the disturbing influence of the sustained-action brake can be approximately compensated.

The method of the present invention can reduce further the otherwise disturbing influence of possibly different tire radii at the axles on $ds_u$ and ds by the influence being determined during unbraked phases of approximately constant speed (in particular as early as the up-change intervals during starting) by cross-comparison of the wheel speeds and being subtracted from $ds_u$. Further advantages are obtained with the method if the calculated setpoint pressure distribution is used as basic pressure distribution in an electrically/electronically controlled pressure-medium braking system.

Finally, the present invention allows the calculated setpoint pressure distribution to act via a hydraulic, pneumatic or electric actuator on a conventional ALB control valve in an otherwise conventional brake system in order, in this way, to replace the currently customary mechanical ALB linkage, preferably at the rear axle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of distributing brake pressure to axles of a motor vehicle having an ABS pressure-medium brake, an electrically acting anti-lock brake system (ABS) with an electronic centralized control and electrically controllable brake valves proximate the axles and comprising speed sensors which are assigned to the brakable wheels and serve as actual-value, instantaneous wheel speed sensors for an ABS control operative at a wheel brake pressure near a wheel lock limit, comprising the steps of regulating automatically an inter-axle brake-pressure distribution $\phi$ in a slip range below a range in which the ABS control is operative in accordance with an evaluation of the wheel-speed signals supplied by the wheel-speed sensors and the exceeding of a first predeterminable limiting value ds, by a referred difference of inter-axle wheel speeds upon braking as a condition for a first regulation of said inter-axle brake-pressure distribution $\phi$, performing dynamically the first regulation when the limiting value $ds_1$ is exceeded for intervention in individual brake applications in the sense of a continuously cyclic acquisition and processing of current actual wheel-speed differences to immediately influence the brake-pressure distribution while a respective braking operation is still underway, and making a second regulation in the manner of an adaptively predictive precontrol of the brake-pressure distribution $\phi$ for any retardation levels is made the basis of the first regulation, by seeking mutually associated steady-state values of the referred inter-axle wheel speed difference and of the retardation in the case of previous brake-pressure distribution on the basis of predetermined limiting values for the time rate of change thereof, determining, after at least one initial brake application, parameters of a brake-pressure distribution function, as soon as steady-state values are present, then, after at least one initial brake application, in which function a setpoint deceleration demanded by a driver via a brake pedal is included, using the brake-pressure distribution as a basis for subsequent braking operations, and correcting the previous value of the brake-pressure distribution to a current value by the first regulation in the current cycle as soon as a second, smaller limiting value is exceeded by a steady-state value of the referred speed difference, after the determination of the parameters in the course of a subsequent brake application.

2. The method according to claim 1, wherein a precalculation of the inter-axle brake-pressure distribution $\phi$ for retardations including high retardations, is carried out on the basis of data from normally low retardations.

3. The method according to claim 2, wherein, after a number of braking operations required for identification of the correct parameters, brake-pressure changes relative to optimum pressures are permitted at individual axles for the rest of a current journey in order to obtain uniform lining wear at one of all axles and wheels, such that any detected imbalances in lining wear are compensated.

4. The method according to claim 1, wherein the parameters of an optimum brake-pressure distribution are estimated based on wheel-speed curves during a first brake actuation on a journey and, after further brake applications, are fixed for the remainder of the journey.

5. The method according to claim 1, wherein the parameters are determined by algorithms which have been established jointly based on preceding investigations on scatter bands of at least wheel bases and heights of the center of gravity of entire families of vehicles such that, given a known brake-pressure distribution and a vehicle mass factor estimated from a pressure level and retardation achieved, referred average wheel-speed differences are sufficient for the determination of the parameters.

6. The method according to claim 1, wherein the step of determining the parameters designated as a and b are determined individually for an individual vehicle, starting from one of permanently stored and estimated starting values designated as $a_0$, $b_0$, includes calculating an approximation parabola, $ds_m = f(Z_m)$ via of stored, assigned steady-state value pairs designated $ds_m$, $z_m$ from a number of brake applications at the beginning of a journey, with parabola coefficients designated $a_{p1}$ and $a_{p2}$ determining a relationship da/db; and determining the parameter a as $a = a_0 + da$, and the parameter b as $b = b_0 + db$ by extrapolation from relative speed change designated $dds_m$ which has resulted from an early first correction of $a_0$ alone at initiation of a journey.

7. The method according to claim 1, wherein variables designated as $ds_m$ and $Z_m$ from steady-state braking phases are formed as average values, and the undershooting of predetermined limiting values for the time rate of change of the variables $ds_m$ and $Z_m$ serves as criterion for the existence of steady-state braking phases.

8. The method according to claim 1, wherein, after a number of braking operations required for identification of the correct parameters, brake-pressure changes relative to optimum pressures are permitted at individual axles for the rest of a current journey in order to obtain uniform lining wear at one of all axles and wheels, such that any detected imbalances in lining wear are compensated.

9. The method according to claim 8, wherein the parameters of an optimum brake-pressure distribution are estimated on the basis of wheel-speed curves during a first brake actuation and, after further brake applications, are fixed for the remainder of the journey.

10. The method according to claim 8, wherein the parameters are determined by algorithms which have been established jointly on the basis of preceding investigations on scatter bands of at least wheel bases and heights of the center of gravity of entire families of vehicles such that, given a known brake-pressure distribution and a vehicle mass factor estimated from a pressure level and retardation achieved, referred average wheel-speed differences are sufficient for the determination of the parameters.

11. The method according to claim 8, wherein the step of determining the parameters designated as a and b are determined individually for an individual vehicle, starting from one of permanently stored and estimated starting values designated as $a_0$, $b_0$, includes calculating an approximation parabola $ds_m = f(Z_m)$, via stored, assigned steady-state value pairs $ds_m$, $z_m$ from a number of brake applications at the beginning of a journey, with parabola coefficients designated as $a_{p1}$ and $a_{p2}$ determining a relationship da/db; and determining the parameter a as $a = a_0 + da$, and the parameter b as $b = b_0 + db$ by extrapolation from relative speed change designated as $dds_m$ which has resulted from an early first correction of $a_0$ alone at the beginning of a journey.

12. The method according to claim 8, wherein variables designated as $ds_m$ and $Z_m$ from steady-state braking phases are formed as average values, and the undershooting of predetermined limiting values for the time rate of change of the variables $ds_m$ and $Z_m$ serves as criterion for the exisistence of steady-state braking phases.

13. The method according to claim 1, wherein one of the single and, in rapid succession, multiple exceeding of the first limiting value of the control of the brake-pressure distribution is used as a criterion for the redetermination of the parameters and wear regulation is suspended during this phase.

14. The method according to claim 13, wherein, after a number of braking operations required for identification of the correct parameters, brake-pressure changes relative to optimum pressures are permitted at individual axles for the rest of a current journey in order to obtain uniform lining wear at one of all axles and wheels, such that any detected imbalances in lining wear are compensated.

15. The method according to claim 1, wherein a currently calculated average speed difference is replaced by a difference of that value with respect to a speed difference in the unbraked condition, and the value for the speed difference in the unbraked condition is determined in a time period immediately prior to the onset of the braking effect.

16. The method according to claim 15, wherein a disturbing influence of possibly different tire radii at the axles of the speed difference in the unbraked condition and the inter-axle speed difference is reduced by being determined during unbraked phases of approximately constant speed and already in up-change intervals during starting, by cross-comparison of the wheel speeds, and being subtracted from the speed difference in the unbraked condition.

17. The method according to claim 1, wherein a quotient is calculated on the basis of at least two steady-state braking phases having a different brake pressure distribution but an approximately equal retardation level, which quotient permits the calculation of a value for further brake applications during this journey, and a disturbing influence of the sustained brake-action is approximately compensated using this value.

18. The method according to claim 1, wherein the calculated setpoint brake-pressure distribution is used as basic pressure distribution in an electrically or electronically controlled pressure-medium brake system.

19. The method according to claim 1, wherein the calculated setpoint brake-pressure distribution acts via one of a hydraulic, pneumatic and electric actuator on a conventional ALB control valve in a conventional brake system in order to replace a mechanical ALB linkage.

20. In a motor vehicle having an ABS pressure-medium brake associated with each vehicle wheel, an electrically-acting anti-lock brake system (ABS) with an electronic centralized control, and electrically controllable brake valves proximate axles of the vehicles and comprising speed sensors assigned to the brakable vehicle wheels operable to serve as actual-value, instantaneous wheels speed sensors for control of the ABS at a wheel brake pressure near a wheel lock limit, the improvement comprising means for distributing brake pressure to the axles by automatically regulating inter-axle brake pressure distribution $\phi$ in a slip range below a range in which the ABS control is operative in accordance with an evaluation of the wheel-speed signals supplied by the wheel-speed sensors using the exceeding of a first predeterminable limiting value ds, by a referred difference of inter-axle wheel speeds upon braking as a condition for a first regulation of said inter-axle brake-pressure distribution, performing dynamically the first regulation when the limiting value $ds_1$ is exceeded, for intervention in individual brake application, in the sense of a continuously cyclic acquisition and processing of current actual wheel-speed differences to immediately influence the brake-pressure distribution while a respective braking operation is still underway, and making a second regulation in the manner of an adaptively predictive precontrol of the brake-pressure distribution $\phi$ for any retardation levels the basis of the first regulation by seeking mutually associated steady-state values of the referred inter-axle speed difference and of the retardation in the case of a previous brake-pressure distribution $\phi=(P_{front}/P_{read})$ on the basis of predetermined limiting values for the time rate of change thereof, determining after at least one initial brake application parameters of a brake-pressure distribution function as soon as steady-state values are present, then, after at least one initial brake application, in which function a setpoint deceleration demanded by a driver via a brake pedal is included, using the brake-pressure distribution as a basis for the subsequent braking operations, and correcting the old value of the brake-pressure distribution to a new value by the first regulation in the current cycle as soon as a second, smaller limiting value is exceeded by a steady-state value of the referred speed difference, after the determination of the parameters in the course of a subsequent brake application.

* * * * *